United States Patent
Koshi et al.

(10) Patent No.: US 11,739,185 B2
(45) Date of Patent: Aug. 29, 2023

(54) FIBER-REINFORCED POLYMER ALLOY SUBSTRATE AND MOLDED ARTICLE USING SAME

(71) Applicant: Toray Industries, Inc., Tokyo (JP)

(72) Inventors: Masayuki Koshi, Nagoya (JP); Naoya Ouchiyama, Nagoya (JP); Yoshihiro Naruse, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 347 days.

(21) Appl. No.: 17/258,234

(22) PCT Filed: Jul. 9, 2019

(86) PCT No.: PCT/JP2019/027109
§ 371 (c)(1),
(2) Date: Jan. 6, 2021

(87) PCT Pub. No.: WO2020/017392
PCT Pub. Date: Jan. 23, 2020

(65) Prior Publication Data
US 2021/0277194 A1    Sep. 9, 2021

(30) Foreign Application Priority Data

Jul. 17, 2018 (JP) ................................. 2018-134281
Sep. 28, 2018 (JP) ................................. 2018-184572

(51) Int. Cl.
C08L 81/02 (2006.01)
C08J 5/04 (2006.01)
C08K 3/04 (2006.01)
C08L 101/12 (2006.01)

(52) U.S. Cl.
CPC ................ C08J 5/042 (2013.01); C08K 3/04 (2013.01); C08L 101/12 (2013.01)

(58) Field of Classification Search
CPC .... C08J 5/042; C08J 2471/10; C08J 2479/08; C08J 2481/06; C08J 5/04; C08K 3/04; C08K 7/04; C08L 101/12; C08L 81/02; C08L 71/12; C08L 79/08; B29C 70/52
USPC .......................................................... 524/495
See application file for complete search history.

(56) References Cited

U.S. PATENT DOCUMENTS

| 5,866,648 A | * | 2/1999 | Saito ......................... C08J 5/04 524/847 |
| 10,723,088 B2 | | 7/2020 | Koshi et al. |
| 2022/0145047 A1 | * | 5/2022 | Ishida .................... B33Y 70/10 |

FOREIGN PATENT DOCUMENTS

| JP | 2003-305779 | 10/2003 |
| JP | 2008-231249 | 10/2008 |
| JP | 2013-159675 | 8/2013 |
| WO | 2018/061597 | 4/2018 |

* cited by examiner

*Primary Examiner* — Hannah J Pak
(74) *Attorney, Agent, or Firm* — DLA Piper LLP (US)

(57) ABSTRACT

A fiber-reinforced polymer alloy substrate, in which continuous reinforcing fibers are arranged in parallel and are impregnated with a polymer alloy, is characterized in that: a polymer alloy obtained by combining thermoplastic resins of at least two types is used as the polymer alloy; the fiber volume content is in the range of 40 to 70% by volume; and the dispersion parameter D of the fibers is 90% or more. In the obtained fiber-reinforced polymer alloy substrate, the reinforcing fibers are dispersed with high uniformity, and high mechanical properties and heat resistance are stably exhibited with low variation.

11 Claims, No Drawings

FIBER-REINFORCED POLYMER ALLOY SUBSTRATE AND MOLDED ARTICLE USING SAME

TECHNICAL FIELD

This disclosure relates to a fiber-reinforced polymer alloy substrate and a molded article using the same.

BACKGROUND

Since a fiber-reinforced thermoplastic resin substrate, which is made by impregnating continuous reinforcing fibers with a thermoplastic resin, is excellent in specific strength and specific rigidity, high in weight reducing effect, and high in heat resistance and chemical resistance, it is preferably used for various applications such as transportation equipment of aircraft, automobiles or the like, sports, and electric/electronic parts. In recent years, due to the increasing demand for weight reduction, replacement of metal parts with resin parts, making parts smaller, and modularization are progressing, mainly for aircraft and automobile applications, and therefore, development of a material more excellent in moldability and mechanical properties is required.

As a composite material for a structural material excellent in moldability and mechanical properties, for example, a fiber-reinforced thermoplastic resin prepreg (for example, JP-A-2013-159675) made of a polyamide resin containing carbon fibers is known. Although such a prepreg is expected as a material for weight reduction because of its high mechanical properties, to stably exhibit mechanical properties, it is necessary that it is excellent in the impregnation property of a matrix resin between fiber bundles, and reinforcing fibers are uniformly dispersed in the fiber-reinforced thermoplastic resin substrate.

Further, in recent years, the fiber-reinforced thermoplastic resin prepreg is required to have a high heat resistance mainly for aircraft applications, and together with the aforementioned moldability and mechanical properties, it is required to satisfy both contradictory properties as for a matrix resin used for the fiber-reinforced thermoplastic resin substrate.

It is difficult to achieve the above-described both properties with a single resin. Therefore, by combining polymers with different properties, a technology that extracts the advantages of respective polymers and supplementing the disadvantages thereof, thereby exhibiting excellent properties as compared to a single polymer, namely, a polymer alloy technology is of interest.

Accordingly, with respect to a fiber-reinforced polymer alloy substrate having a polymer alloy as a matrix, it could be helpful to provide a fiber-reinforced polymer alloy substrate in which reinforcing fibers are dispersed more reliably and uniformly, and high mechanical properties and heat resistance can be stably exhibited with a small variation.

SUMMARY

We thus provide:

[1] A fiber-reinforced polymer alloy substrate, in which continuous reinforcing fibers are arranged in parallel and are impregnated with a polymer alloy, characterized in that: a polymer alloy obtained by combining thermoplastic resins of at least two types is used as the polymer alloy, a fiber volume content is 40 to 70% by volume and a dispersion parameter D of the fibers determined by the following method is 90% or more.

(i) A cross section of the fiber-reinforced polymer alloy substrate perpendicular to a direction of the reinforcing fiber orientation is divided into a plurality of sections, and among them, one section is photographed.

(ii) The captured image of the section is divided into a plurality of square units each having a side length t defined by equation (1).

(iii) A dispersion parameter d defined by equation (2) is calculated.

(iv) The procedure of (i) to (iii) is repeated for different sections, and an average value of the dispersion parameters d of the plurality of sections obtained from the cross section is defined as the dispersion parameter D.

$$1.5a \leq t \leq 2.5a \ (a: \text{fiber diameter}, t: \text{length of one side of unit}) \quad (1)$$

$$\text{Dispersion parameter } d = \text{number of units containing reinforcing fibers in one section/total number of units in one section} \times 100(\%) \quad (2)$$

[2] The fiber-reinforced polymer alloy substrate according to [1], wherein a coefficient of variation of the dispersion parameters d is 4% or less.

[3] The fiber-reinforced polymer alloy substrate according to [1] or [2], wherein the polymer alloy is a polymer alloy prepared by combining at least two resins selected from polyphenylene sulfide resin (PPS), polyarylene ether ketone resin (PAEK), polyether sulfone resin (PES), polyetherimide (PEI) and a liquid crystal polymer (LCP).

[4] The fiber-reinforced polymer alloy substrate according to any one of [1] to [3], wherein a polymer alloy, which forms a both-phases continuing structure having a structural cycle of 0.001 to 10 μm, or an island/sea structure composed of an island phase having a particle diameter of 0.001 to 10 μm and a sea phase, is contained.

[5] The fiber-reinforced polymer alloy substrate according to any one of [1] to [4], wherein a distance between centers of adjacent reinforcing fibers is 5 μm to 15 μm.

[6] The fiber-reinforced polymer alloy substrate according to [4] or [5], wherein the structural cycle of the polymer alloy or the particle diameter of a resin forming the island phase in the fiber-reinforced polymer alloy substrate is smaller than a distance between reinforcing fibers represented by equation (6).

$$z = y - 2r \ (z: \text{distance between reinforcing fibers}, y: \text{distance between centers of reinforcing fibers}, r: \text{fiber radius}) \quad (6)$$

[7] The fiber-reinforced polymer alloy substrate according to any one of [1] to [6], wherein a thickness is 0.01 mm to 1.5 mm.

[8] The fiber-reinforced polymer alloy substrate according to any one of [1] to [7], wherein the reinforcing fibers are carbon fibers.

[9] The fiber-reinforced polymer alloy substrate according to any one of [1] to [8], wherein a void ratio is 2% or less.

[10] The fiber-reinforced polymer alloy substrate according to any one of [1] to [9], wherein the fiber-reinforced polymer alloy substrate is obtained by pultrusion molding.

[11] A molded article comprising a fiber-reinforced polymer alloy substrate according to any one of [1] to [10].

[12] A composite molded article integrated with a fiber-reinforced polymer alloy substrate according to any one of [1] to [10] or the molded article according to [11], and a metal material or a molded article thereof or a resin material or a molded article thereof.

We thus provide reinforcing fibers are dispersed with a high uniformity, and a fiber-reinforced polymer alloy substrate impregnated with a polymer alloy, having high mechanical properties and heat resistance, and stably exhibiting them with a small variation can be obtained.

DETAILED DESCRIPTION

Hereinafter, alloy substrates and molded articles will be explained in detail together with examples.

Our fiber-reinforced polymer alloy substrate is obtained by impregnating continuous reinforcing fibers arranged in parallel with a thermoplastic polymer alloy. The continuous reinforcing fibers mean those in which the reinforcing fibers are not discontinued in the fiber-reinforced polymer alloy substrate. As the form and arrangement of the reinforcing fibers, for example, one arranged with the fibers in one direction, woven fabric (cloth), knitted fabric, braid, tow and the like can be exemplified. Among them, it is preferred that the reinforcing fibers are arranged in one direction because the mechanical properties in the specific direction can be efficiently enhanced.

The type of reinforcing fibers is not particularly limited, and carbon fibers, metal fibers, organic fibers and inorganic fibers are exemplified. Two or more types of these may be used. By using carbon fibers as the reinforcing fibers, it is possible to obtain a fiber-reinforced polymer alloy substrate having high mechanical properties while being lightweight.

As the carbon fibers, for example, PAN-based carbon fibers using polyacrylonitrile (PAN) fibers as the raw material, pitch-based carbon fibers using petroleum tar or petroleum pitch as the raw material, and cellulose-based carbon fibers using viscose rayon, cellulose acetate or the like as the raw material, vapor grown-system carbon fibers using hydrocarbons or the like as the raw material, and graphitized fibers thereof can be exemplified. Among these carbon fibers, PAN-based carbon fibers are preferably used because of their excellent balance between strength and elastic modulus.

As the metal fibers, for example, fibers made of a metal such as iron, gold, silver, copper, aluminum, brass, and stainless steel can be exemplified.

As the organic fibers, for example, fibers made of an organic material such as aramid, polybenzoxazole (PBO), polyphenylene sulfide, polyester, polyamide, and polyethylene can be exemplified. As the aramid fibers, for example, para-system aramid fibers having excellent strength and elastic modulus, and meta-system aramid fibers having excellent flame retardancy and long-term heat resistance or the like can be exemplified. As the para-system aramid fibers, include, for example, polyparaphenylene terephthalamide fibers, copolyparaphenylene-3,4'-oxydiphenylene terephthalamide fibers or the like can be exemplified, and as the meta-system aramid fibers, polymetaphenylene isophthalamide fibers or the like can be exemplified. As the aramid fibers, the para-system aramid fibers high in elastic modulus as compared to the meta-system aramid fibers are preferably used.

As the inorganic fibers, for example, fibers made of an inorganic material such as glass, basalt, silicon carbide, and silicon nitride can be exemplified. As the glass fibers, for example, E glass fibers (for electricity), C glass fibers (for corrosion resistance), S glass fibers, T glass fibers (high strength and high elastic modulus) or the like can be exemplified. The basalt fibers are fibers of mineral basalt and have a very high heat resistance. The basalt generally contains 9 to 25% by weight of FeO or $FeO_2$ which is a compound of iron and 1 to 6% by weight of TiO or $TiO_2$ which is a compound of titanium, and it can also be made fibrous at a state of being molted and increasing the content of these components.

Since the fiber-reinforced polymer alloy substrate is often expected to serve as a reinforcing material, it is desired to exhibit high mechanical properties, and to exhibit high mechanical properties, it is preferred to contain carbon fibers as reinforcing fibers.

In a fiber-reinforced polymer alloy substrate, reinforcing fibers are usually composed by arranging one or a plurality of reinforcing fiber bundles in which a large number of single fibers are bundled. The total filament number of filaments of the reinforcing fibers (the number of single fibers) when one or more reinforcing fiber bundles are arranged is preferably 1,000 to 2,000,000. From the viewpoint of productivity, the total number of filaments of the reinforcing fibers is more preferably 1,000 to 1,000,000, further preferably 1,000 to 600,000, and particularly preferably 1,000 to 300,000. The upper limit of the total number of filaments of the reinforcing fibers may be decided so that productivity, dispersibility, and handleability can be kept good, while considering the balance between dispersibility and handleability.

One reinforcing fiber bundle is preferably formed by bundling 1,000 to 50,000 single fibers of reinforcing fibers having an average diameter of 5 to 10 μm.

The polymer alloy can be exemplified as a combination of two or more kinds of resins selected from the group of polyesters such as polyethylene terephthalate (PET) resin, polybutylene terephthalate (PBT) resin, polytrimethylene terephthalate (PTT) resin, polyethylene naphthalate (PEN) resin liquid crystal polyester resin and the like, polyolefins such as polyethylene (PE) resin, polypropylene (PP) resin, polybutylene resin and the like, and other than styrene-based resin, polyoxymethylene (POM) resin, polyamide (PA) resin, polycarbonate (PC) resin, polymethylene methacrylate (PMMA) resin, polyvinyl chloride (PVC) resin, polyphenylene sulfide (PPS) resin, polyphenylene ether (PPE) resin, modified PPE resin, polyimide (PI) resin, polyamideimide (PAI) resin, polyetherimide (PEI)) resin, polysulfone (PSU) resin, modified PSU resin, polyethersulfone resin, polyketone (PK) resin, polyarylene ether ketone resin (PAEK), polyarylate (PAR) resin, polyether nitrile (PEN) resin, phenol-based resin, phenoxy resin, fluorine-based resin such as polytetrafluoroethylene resin, and further, thermoplastic elastomers such as polystyrene-based resin, polyolefin-based resin, polyurethane-based resin, polyester-based resin, polyamide-based resin, polybutadiene-based resin, polyisoprene-based resin, and fluorine-based resin and the like. In particular, from the viewpoint of mechanical properties and heat resistance, as the polymer alloy, more preferably used is a thermoplastic polymer alloy prepared by combining at least two resins selected from polyphenylene sulfide resin (PPS), polyarylene ether ketone resin (PAEK), polyether sulfone resin (PES), polyetherimide (PEI) and a liquid crystal polymer (LCP).

The above-described polyarylene ether ketone resin (PAEK) may be a resin such as polyether ketone (PEK), polyether ether ketone (PEEK), polyether ether ketone ketone (PEEKK), polyether ketone ketone (PEKK), polyether ketone ether ketone ketone (PEKEKK), polyether ether ketone ether ketone (PEEKEK), polyether ether ketone (PEEEK), polyether diphenyl ether ketone (PEDEK) and the like, a copolymer thereof, a modified product thereof, and a resin blended with two or more kinds of these.

With respect to the polymer alloy, in the fiber-reinforced polymer alloy substrate, it is preferred that the polymer alloy forms a both-phases continuing structure having a structural cycle of 0.001 to 10 µm, or an island/sea structure composed of an island phase having a particle diameter of 0.001 to 10 µm and a sea phase. By controlling the both-phases continuing structure having a structural cycle of 0.001 to 10 µm, or the island/sea structure composed of an island phase having a particle diameter of 0.001 to 10 µm and a sea phase, high mechanical properties and heat resistance can be exhibited. It is more preferable to form a both-phases continuing structure having a structural cycle of 0.01 to 5 µm, or an island/sea structure composed of an island phase having a particle diameter of 0.01 to 5 µm and a sea phase, and it is further preferable to form a both-phases continuing structure having a structural cycle of 0.1 to 1 µm, or an island/sea structure composed of an island phase having a particle diameter of 0.1 to 1 µm and a sea phase.

In a polymer alloy that combines three or more kinds of thermoplastic resins, respective structures can be appropriately combined, for example, such as (i) a combination of both-phases continuing structure and island/sea structure, (ii) a combination of different types of both-phases continuing structures, (iii) a multi-phase continuing structure composed of three or more kinds of resins or the like.

Further, to confirm these both-phases continuing structures or dispersion structures, it is preferred to confirm a regular cyclic structure. This requires that, for example, in addition to confirming that a both-phases continuing structure is formed by observation with an optical microscope or a transmission electron microscope, it is necessary to confirm that a scattering maximum appears in a scattering measurement performed using a small-angle X-ray scattering device or a light scattering device. The existence of the scattering maximum in this scattering measurement is a proof that it has a regular phase-separation structure with a certain cycle, and the cycle $\Lambda m$ (nm) corresponds to the structural cycle in the both-phases continuing structure, and corresponds to the distance between particles in the dispersion structure. Further, the value thereof can be calculated by equation (7) using the wavelength $\lambda$ (nm) of the scattered light in the scattering body and the scattering angle $\theta m$ (deg °) that gives the scattering maximum.

$$\Lambda m = (\lambda/2)/\sin(\theta m/2) \qquad (7)$$

Further, even if the size of the structural cycle in the both-phases continuing structure or the size of the distance between particles in the dispersion structure is within the above range, if there is a part that is structurally coarse, for example, by a condition such as one in that a destruction progresses from the part as a starting point when an impact is applied, the original properties of the polymer alloy may not be obtained. Therefore, the uniformity of the structural cycle in the both-phases continuing structure or the distance between particles in the dispersion structure of the polymer alloy becomes important. This uniformity can be evaluated by the small angle X-ray scattering measurement or the light scattering measurement of the above-described polymer alloy. Because the small-angle X-ray scattering measurement and the light scattering measurement differ in the size of the phase separation structure that can be analyzed, it is necessary to separately use them appropriately in accordance with the size of the phase separation structure of the polymer alloy to be analyzed. In the small-angle X-ray scattering measurement and the light scattering measurement, in addition to the information on the size of the structural cycle in the both-phases continuing structure or the distance between particles in the dispersion structure, an information with respect to the distribution thereof can be obtained. Concretely, it corresponds to the peak positions of the scattering maximum in the spectra obtained by these measurements, that is, the scattering angle $\theta m$ (deg °) corresponds to the size of the structural cycle in the both-phases continuing structure or the distance between particles in the dispersion structure, and the spread of the peak corresponds to the uniformity of the structure. To obtain excellent physical properties such as mechanical properties, it is preferable that the structural uniformity is high, and the polymer alloy characterized in that the scattering spectrum obtained by small-angle X-ray scattering measurement or light scattering measurement has a maximum value.

The fiber-reinforced polymer alloy substrate is obtained by impregnating continuous reinforcing fibers with the aforementioned thermoplastic polymer alloy, and as needed, further, a filler, various additives and the like may be contained.

As the filler, arbitrary one generally used as a filler for resins can be used, thereby further improving the strength, rigidity, heat resistance, and dimensional stability of the fiber-reinforced polymer alloy substrate or the molded article using the same. As the filler, for example, exemplified are fibrous inorganic fillers such as glass fiber, carbon fiber, potassium titanate whisker, zinc oxide whisker, aluminum borate whisker, aramid fiber, alumina fiber, silicon carbide fiber, ceramic fiber, asbestos fiber, plaster fiber, metal fiber and the like, and non-fibrous inorganic fillers such as wallastenite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide, silica and the like. Two or more types of these may be contained. These fillers may be hollow. Further, they may be treated with a coupling agent such as an isocyanate-based compound, an organic silane-based compound, an organic titanate-based compound, an organic borane-based compound and an epoxy compound. Further, as the montmorillonite, an organized montmorillonite in which interlayer ions are cation-exchanged with an organic ammonium salt may be used. If the fibrous filler is made of discontinuous fibers, it can give a function without damaging the reinforcement effect due to the reinforcing fibers made of continuous fibers.

As the various additives, for example, exemplified are antioxidants and heat resistance stabilizers (hindered phenol-based, hydroquinone-based, phosphite-based and substitution products thereof, copper halides, iodine compounds and the like), weathering agents (resorcinol-based, salicylate-based, benzotriazole-based, benzophenone-based, hindered amine-based and the like), release agents and lubricants (aliphatic alcohol, aliphatic amide, aliphatic bisamide, bisurea and polyethylene wax and the like), pigments (cadmium sulfide, phthalocyanine, carbon black and the like), dyes (nigrosine, aniline black and the like), plasticizers (octyl p-oxybenzoate, N-butylbenzene sulfonamide and the like), antistatic agents (alkyl sulfate type anionic antistatic agent, quaternary ammonium salt type cationic antistatic agent, nonionic antistatic agent such as polyoxyethylene sorbitan monostearate, betaine-based ampholytic antistatic agent and the like), flame retardants (melamine cyanurate, hydroxides such as magnesium hydroxide and aluminum hydroxide, polyphosphoric ammonium, brominated polystyrene, brominated polyphenylene oxide, brominated polycarbonate, brominated epoxy resin or a combination of these brominated flame retardants and antimony trioxide and the like, and the like. Two or more types of these may be compounded.

The fiber-reinforced polymer alloy substrate can be obtained by impregnating continuous reinforcing fibers with a polymer alloy.

As the impregnation method, for example, exemplified are a film method of melting a film-shaped polymer alloy and impregnating the polymer alloy into a reinforcing fiber bundle by pressurizing it, a commingle method of mixing a fibrous polymer alloy and a reinforcing fiber bundle, and then impregnating the reinforcing fiber bundle with the polymer alloy by melting and pressing the fibrous polymer alloy, a powder method of dispersing powdered polymer alloy in the gaps between the fibers in the reinforcing fiber bundle, and then impregnating the reinforcing fiber bundle with the polymer alloy by melting and pressing the powdered polymer alloy, and a protrusion method of immersing the reinforcing fiber bundle into molten polymer alloy, and impregnating the reinforcing fiber bundle with the polymer alloy by pressing. The protrusion method is preferable because a variety of fiber-reinforced polymer alloy substrates with various thicknesses and fiber volume contents can be produced.

The thickness of the fiber-reinforced polymer alloy substrate is preferably 0.01 to 1.5 mm. If the thickness is 0.01 mm or more, the strength of the molded article obtained by using the fiber-reinforced polymer alloy substrate can be improved. It is more preferably 0.05 mm or more. On the other hand, if the thickness is 1.5 mm or less, the reinforcing fibers are more easily impregnated with the polymer alloy. It is more preferably 1 mm or less, further preferably 0.7 mm or less, and still further preferably 0.6 mm or less.

Further, in the fiber-reinforced polymer alloy substrate, reinforcing fibers are contained at a content of 40% by volume or more and 70% by volume or less relative to 100% by volume of the whole of the fiber-reinforced polymer alloy substrate. By containing 40% by volume or more of reinforcing fibers, the strength of the molded article obtained by using the fiber-reinforced polymer alloy substrate can be more improved. It is more preferably 45% by volume or more, further preferably 50% by volume or more. On the other hand, by containing 70% by volume or less of reinforcing fibers, the polymer alloy is impregnated into the reinforcing fibers more easily. It is more preferably 65% by volume or less, further preferably 60% by volume or less.

The volume content Vf of the reinforcing fibers of the fiber-reinforced polymer alloy substrate was measured by measuring the mass W0 (g) of the fiber-reinforced polymer alloy substrate, thereafter, heating the fiber-reinforced polymer alloy substrate in air at 500° C. for 30 minutes to burn off the polymer alloy component, measuring the mass W1 (g) of the remaining reinforcing fibers, and calculating Vf by equation (3).

$$Vf \text{ (volume \%)} = (W1/\rho f)/\{W1/\rho f + (W0-W1)/\rho 1\} \times 100 \quad (3)$$

$\rho f$: density of reinforcing fiber (g/cm$^3$)
$\rho 1$: density of polymer alloy (g/cm$^3$)

In the fiber-reinforced polymer alloy substrate, it is preferred that the content of voids (void ratio) contained in the fiber-reinforced polymer alloy substrate is 2% or less. By the condition where the void ratio is 2% or less, the mechanical properties of the fiber-reinforced polymer alloy substrate can be exhibited without damaging the mechanical properties of the reinforcing fibers. The void ratio is more preferably 1.5% or less, further preferably 1% or less.

The void ratio of the fiber-reinforced polymer alloy substrate was determined by observing the cross section in the thickness direction of the fiber-reinforced polymer alloy substrate as follows. A sample in which a fiber-reinforced polymer alloy substrate was embedded in an epoxy resin was prepared, and the sample was polished until a cross section in the thickness direction of the fiber-reinforced polymer alloy substrate could be observed well. The polished sample was photographed at a magnification of 400 times using a ultra-depth color 3D shape measuring microscope VHX-9500 (controller section)/VHZ-100R (measuring section) (supplied by KEYENCE CORPORATION). The photographing range was a range of thickness of fiber-reinforced polymer alloy substrate×width 500 µm. In the photographed image, the cross-sectional area of the substrate and the area of the portions having spaces (voids) were determined, and the impregnation ratio was calculated by equation (4).

$$\text{Void ratio (\%)} = (\text{total area of portions occupied by voids})/(\text{total area of fiber–reinforced polymer alloy substrate}) \times 100 \quad (4)$$

In the fiber-reinforced polymer alloy substrate, the dispersion parameter D defined by the following method is 90% or more. By the condition where the dispersion parameter D is 90% or more, variation in mechanical properties of the fiber-reinforced polymer alloy substrate can be reduced.

Calculation of Dispersion Parameter D (i) A cross section of the fiber-reinforced polymer alloy substrate perpendicular to a direction of the reinforcing fiber orientation is divided into a plurality of sections, and among them, one section is photographed.

(ii) The captured image of the section is divided into a plurality of square units each having a side length t defined by equation (1).

(iii) A dispersion parameter d defined by equation (2) is calculated.

(iv) The procedure of (i) to (iii) is repeated for different sections, and an average value of the dispersion parameters d of the plurality of sections obtained from the cross section is defined as the dispersion parameter D.

$$1.5a \leq t \leq 2.5a (a\text{: fiber diameter, } t\text{: length of one side of unit}) \quad (1)$$

$$\text{Dispersion parameter } d = \text{number of units containing reinforcing fibers in one section/total number of units in one section} \times 100(\%) \quad (2)$$

Evaluation Method

The fiber-reinforced polymer alloy substrate of a sample was embedded in an epoxy resin "Epoquick" (registered trademark: supplied by Buhler Co., Ltd.) and cured at room temperature for 24 hours, and thereafter, the cross section approximately perpendicular to the orientation direction of the reinforcing fibers in the fiber-reinforced polymer alloy substrate was polished, and then, the polished surface was photographed while changing the position with a ultra-depth color 3D shape measuring microscope VHX-9500 (controller section)/VHZ-100R (measuring section) (supplied by KEYENCE CORPORATION).

Image analysis was performed on the photograph of the cross section of the fiber-reinforced polymer alloy substrate that was taken, and it was divided into a plurality of approximately square units that do not overlap with each other and each of which has a length of one side defined by equation (1). Image analysis was sequentially performed on the approximately square units, the units containing the reinforcing fibers in the approximately square units were counted, and the dispersion parameter d was calculated from equation (2).

In the above-described image processing, the dispersion parameter d is determined by calculating the number of units containing reinforcing fibers in the unit relative to the total number of divided approximately square units. Although the binarization principally adopts the discriminant analysis method, as the case may be, it is possible to perform it with manual method while comparing with the photographed image.

Further, the reinforcing fiber contained in the square unit is counted even if only a part of the reinforcing fiber is contained, and even if two or more reinforcing fibers are contained in a same unit, such a case is counted as one unit.

One polished surface is photographed over 20 times or more while changing the photographing position, and from dispersion parameters d of the fiber-reinforced polymer alloy substrate obtained from respective cross-sectional photographs, an average value may be calculated as dispersion parameter D, and from the value thereof, it becomes possible to quantitatively evaluate the distribution state of reinforcing fibers in the fiber-reinforced polymer alloy substrate. When a sufficient number of photographs of the cross section cannot be secured, it is also possible to take a plurality of photographs with respect to polished surfaces of different cross sections of the fiber-reinforced polymer alloy substrate, calculate dispersion parameters d, and finally determine a dispersion parameter D.

The size of the unit determined by equation (1) is defined by the relationship with the diameter of the observed reinforcing fibers. If the size of the unit is smaller than the range of equation (1), the dispersion parameter is converged to the volume content and the dispersibility cannot be accurately expressed. On the other hand, if it is larger than the range of equation (1), the value becomes constant regardless of whether the dispersibility is good or bad, and it is not accurate. Therefore, the size of the unit needs to be within the range of equation (1).

Further, the coefficient of variation of the dispersion parameters d is determined from equation (5). If the coefficient of variation exceeds 4%, the density of reinforcing fibers greatly varies depending upon the location on the fiber-reinforced polymer alloy substrate. Therefore, the coefficient of variation is preferably 4% or less, more preferably 3% or less.

Coefficient of variation=average value of dispersion parameters $d$/standard deviation of dispersion parameters $d \times 100$ (5)

In the fiber-reinforced polymer alloy substrate, it is preferred that the distance between centers of adjacent reinforcing fibers is 5 μm to 15 μm. By the condition where the distance between centers of adjacent reinforcing fibers is 5 μm or more, because the polymer alloy can be uniformly present between the reinforcing fibers, it is excellent in high mechanical properties and heat resistance. It is more preferably 6 μm or more. By the condition of 15 μm or less, because the reinforcing fibers effectively reinforce the polymer alloy, the mechanical properties and heat resistance are excellent. It is more preferably 10 μm or less, and further preferably 9 μm or less.

Evaluation Method

The fiber-reinforced polymer alloy substrate of a sample was embedded in an epoxy resin "Epoquick" (registered trademark: supplied by Buhler Co., Ltd.) and cured at room temperature for 24 hours, and thereafter, the cross section approximately perpendicular to the orientation direction of the reinforcing fibers in the fiber-reinforced polymer alloy substrate was polished, and then, the polished surface was photographed while changing the position with a ultra-depth color 3D shape measuring microscope VHX-9500 (controller section)/VHZ-100R (measuring section) (supplied by KEYENCE CORPORATION).

Measurement Section

With respect to a cross-sectional photograph of the fiber-reinforced polymer alloy substrate taken, a predetermined number of single fibers of the reinforcing fibers are selected, and with respect to all the selected single fibers and fibers adjacent thereto, the distances between fibers thereof are measured using image processing.

The selection of single fibers is performed from the cross-sectional photographs so that measurements do not overlap. Concretely, the thickness of the fiber-reinforced polymer alloy substrate is divided into square sections each corresponding to a size of being divided into three sections, and single fibers are selected from the vicinity of the center of each block. At least 50 or more single fibers are selected, the distances between adjacent fibers are evaluated at 200 points or more, and the average value thereof is used as a representative value.

The distance between fibers is measured by approximating a single fiber to a perfect circle, and the distance between the centers of the single fibers is measured to evaluate the distance between fibers.

The selected single fiber and the fiber adjacent thereto mean two fibers with which other fibers do not interfere on a straight line created by connecting the centers of the single fibers straightly.

In the fiber-reinforced polymer alloy substrate, it is preferred that the structural cycle of the polymer alloy or the particle diameter of a resin forming the island phase is smaller than a distance between reinforcing fibers represented by equation (6).

$z=y-2r$ ($z$: distance between reinforcing fibers, $y$: distance between centers of reinforcing fibers, $r$: fiber radius) (6)

By the condition where the structural cycle of the polymer alloy or the particle diameter of a resin forming the island phase is smaller than a distance between reinforcing fibers, since the polymer alloy can form an island/sea structure between the reinforcing fibers, the fiber-reinforced polymer alloy substrate can stably exhibit high mechanical properties and heat resistance with a small variation.

The method of producing the fiber-reinforced thermoplastic polymer alloy substrate will be explained in detail.

The production apparatus is constructed, for example, from a creel section capable of holding one or a plurality of bobbins wound with a bundle of reinforcing fibers before impregnation with a matrix resin, a feed section that continuously feeds the bundle of reinforcing fibers from this creel section, an impregnation die that adheres a molten matrix resin to the reinforcing fiber bundle continuously fed, impregnates the resin thereinto by applying a pressure and forms it in a predetermined shape, and a cooling roll for cooling and solidifying the molten matrix resin to form a fiber-reinforced thermoplastic polymer alloy substrate.

In the impregnation step, a molten matrix resin is impregnated into the reinforcing fiber bundle continuously fed. The continuously fed reinforcing fiber bundle usually have a thin layered form. In the production apparatus, a plurality of bobbins each wound with a reinforcing fiber bundle in which 1,000 to 50,000 continuous single fibers of the reinforcing fibers are bundled are prepared, the reinforcing fiber bundles are pulled out and arranged in a lateral direction to form a thin layer (tape shape) as a whole, and the reinforcing fiber bundles are introduced into the impregnation die in which the molten matrix resin is stored, through a plurality of yarn path guides. Further, it is preferred that the layered reinforcing fiber bundles are introduced into the impregnation die in a state of being stacking in two or more layers. By stacking the layered reinforcing fiber bundles in two or more layers, it becomes easy to adjust the size. It is preferred that the layered reinforcing fiber bundles are subjected to a smoothing treatment and then led to a liquid pool portion because the fiber dispersibility can be improved. Although the method for the smoothing treatment is not particularly limited, exemplified are a method of physically pressing with an opposing roll, a method of moving reinforcing fibers using an air flow and the like. The physical pressing method is preferable because it is simple and does not disturb the arrangement of reinforcing fibers.

The impregnation die provided in the production apparatus has a form of a rectangular parallelepiped facing the transfer direction of the reinforcing fiber bundles, and the matrix resin supplied from a feeder is stored in a molten state inside this impregnation die. An inlet hole through which the reinforcing fiber bundle can pass is formed at the inlet of the impregnation die located at an upstream position in the transfer direction of the reinforcing fiber bundles, and the reinforcing fiber bundle enters into the impregnation die through the inlet hole. The inside of the impregnation die has a structure in which the cross-sectional area decreases intermittently in the traveling direction of the fibers, and at an outlet of the impregnation die, a slit-shaped nozzle having a cross-sectional area smaller than the cross-sectional area in the introduction side of the reinforcing fiber bundles of the resin storage portion is formed. Since the reinforcing fiber bundles are pulled in the direction of the nozzle with an accompanying flow of the matrix resin, the pressure of the resin increases as it approaches the nozzle, and the matrix resin is impregnated. It is also possible to introduce a plurality of reinforcing fiber bundles into the impregnation die at a state where each bundle is in a single layer state, and to stack the layers in a state where the matrix resin is adhered and impregnated into each layer, to form them at an arbitrary thickness.

To improve the impregnation property of the fiber-reinforced polymer alloy substrate, it is possible to impregnate while applying a tension to the reinforcing fiber bundles by providing a bar or roll inside the impregnation die, and it is also possible to provide an additional impregnation device such as a bar, a roll or a pressing step at a position after passing through the impregnation die. It is preferred to provide an additional impregnation device from the viewpoint of dispersibility. When performing impregnation operations such as a bar, a roll, or a pressing step, it is preferred to provide a mechanism for regulating the width of the reinforcing fibers from the viewpoint of dispersibility. By regulating the width, it is possible to suppress the excessive spread of the reinforcing fiber bundle and improve the dispersibility.

Further, in the impregnation step, if the force applied for impregnation is small, it is possible to produce without disturbing the arrangement of the reinforcing fiber bundles, and improve the dispersibility of the reinforcing fibers. As a method to reduce the force applied for impregnation, a method of applying ultrasonic waves to the molten resin in the impregnation die, a method of vibrating the reinforcing fiber bundles, or a method of impregnating thin reinforcing fiber bundle layers with the resin and thereafter stacking the respective layers can be exemplified.

By continuously pulling out the reinforcing fiber bundles impregnated with the molten matrix resin from the impregnation die or the additional impregnation device, before the matrix resin impregnated into the reinforcing fiber bundles is solidified, they are formed into a predetermined shape, and thereafter, in the cooling and solidifying step, the molten matrix resin is cooled and solidified to form a fiber-reinforced thermoplastic resin having a predetermined shape. The forming step and the cooling and solidifying step may be performed simultaneously. A die nozzle is provided at the outlet of each of the impregnation die and the additional impregnation device, and the reinforcing fiber bundles pulled out by a take-up roll and impregnated with the matrix resin is formed into a predetermined cross-sectional shape. The dimension of the die nozzle in the transfer direction of the reinforcing fiber bundles is preferably a length corresponding to a passage time to pass the reinforcing fiber bundles through the die nozzle of 0.1 second or more. It is more preferably 0.4 second or more, and further preferably 1.0 second or more. By the dimension of the die nozzle corresponding to the passage time of 0.1 second or more, the time required for the dispersion of the reinforcing fiber bundles is secured, and a fiber-reinforced polymer alloy substrate having a good dispersibility of the reinforcing fiber bundles can be obtained.

The take-up tension of the reinforcing fiber bundle impregnated with the matrix resin is preferably 5 to 200 N, and more preferably 5 to 150 N per 12,000 single fibers. If the take-up tension is less than 5 N, the reinforcing fiber bundles are likely to move, and the reinforcing fiber bundles are easily overlapped with each other or a gap is easily formed between the adjacent reinforcing fiber bundles, which deteriorates the dispersibility of the reinforcing fiber bundles. Further, if it exceeds 200 N, the reinforcing fiber bundles are converged and the impregnation property of the matrix resin is deteriorated. The take-up tension can be appropriately adjusted by the setting conditions of the preliminary tension and the conveying speed. The take-up tension can be increased by increasing the conveying speed. Further, the take-up tension can be appropriately adjusted by the shape of the roll and the arrangement of the roll.

A molded article is obtained by stacking one or more fiber-reinforced polymer alloy substrates in an arbitrary configuration and then applying heat and/or pressure as needed.

As a method of applying heat and/or pressure, for example, exemplified are a press-molding method in which fiber-reinforced polymer alloy substrate stacked in an arbitrary configuration are placed in a mold or on a pressing plate, and then the mold or pressing plate is closed and pressure is applied, an autoclave molding method in which a molding material stacked in an arbitrary configuration is put into an autoclave and pressurized/heated, a bagging molding method in which a molding material stacked in an arbitrary configuration is wrapped with a film or the like, and the inside is reduced in pressure while being pressurized at atmospheric pressure to heat it in an oven, a wrapping tape method in which a tape is wound onto fiber-reinforced polymer alloy substrates stacked in an arbitrary configuration, while applying tension to the tape, and they are heated in an oven, an internal pressure molding method in which fiber-reinforced polymer alloy substrates stacked in an arbitrary configuration are placed in a mold, and a gas or liquid is injected into a core that is also placed in the mold to apply pressure or the like. In particular, since a molded article having less voids therein and excellent in appearance quality can be obtained, the molding method of pressing using a mold is preferably employed.

The fiber-reinforced polymer alloy substrate or its molded article is a highly productive adhesive such as insert molding, outsert molding, or other integrated molding, straightening treatment by heating, heat welding, vibration welding, ultrasonic welding and the like. It is possible to integrate using a construction method and an adhesive, and a composite molded article can be obtained by the integration.

A substrate for molding or a molded article thereof to be integrated with the fiber-reinforced polymer alloy substrate or the molded article thereof is not particularly restricted, and for example, exemplified are a resin material or a molded article thereof, a metal material or a molded article thereof, an inorganic material or a molded article thereof or the like. Among them, a resin material or a molded article thereof or a metal material or a molded article thereof can effectively exhibit the reinforcement effect by the fiber-reinforced polymer alloy substrate. The resin material or its molded article is preferable in terms of the adhesive strength with the fiber-reinforced polymer alloy substrate, and the fiber-reinforced resin obtained by impregnating a matrix resin into a reinforcing fiber mat with a fiber length of 5 to 100 mm is more preferred from the viewpoint of moldability and mechanical properties. As the metal material or its molded article, high tensile-strength steel, aluminum alloy, titanium alloy, magnesium alloy or the like can be used, and it may be selected according to the properties required for a metal layer, metal member, or metal component.

The matrix resin of the molding material integrated with the fiber-reinforced polymer alloy substrate or the molded article thereof may be a same-kind resin as the fiber-reinforced polymer alloy substrate or the molded article thereof, or may be a different-kind resin. To further improve the adhesive strength, a same-kind resin is preferred. In a different-kind resin, it is more preferred to provide a resin layer at the interface.

The fiber-reinforced polymer alloy substrate or its molded article can be used for various applications such as aircraft parts, automobile parts, electric/electronic parts, construction materials, various containers, daily necessities, household goods and sanitary goods by utilizing its excellent properties. The fiber-reinforced polymer alloy substrate or its molded article is particularly preferably used especially for aircraft engine peripheral components, exterior components of aircraft parts, vehicle skeletons as automobile body components, automobile engine peripheral components, automobile under-hood parts, automobile gear parts, automobile interior parts, automobile exterior parts, intake/exhaust system parts, engine cooling water system parts, automobile electrical parts, and electric/electronic parts, which require stable mechanical properties.

Concretely, the fiber-reinforced polymer alloy substrate or its molded article is preferably used for aircraft engine peripheral parts such as fan blades, aircraft-related parts such as landing gear pods, winglets, spoilers, edges, ladders, elevators, fairings, and ribs, automotive body parts such as various seats, front bodies, underbodies, various pillars, various members, various frames, various beams, various supports, various rails, and various hinges, automotive engine peripherals such as engine covers, air intake pipes, timing belt covers, intake manifolds, filler caps, throttle bodies, and cooling fans, automotive under-hood parts such as cooling fans, radiator tank tops and bases, cylinder head covers, oil pans, brake piping, fuel piping tubes, and exhaust gas system parts, automotive gear parts such as gears, actuators, bearing retainers, bearing cages, chain guides, and chain tensioners, automotive interior parts such as shift lever brackets, steering lock brackets, key cylinders, door inner handles, door handle cowls, interior mirror brackets, air conditioner switches, instrumental panels, console boxes, glove boxes, steering wheels, and trims, automotive exterior parts such as front fenders, rear fenders, fuel lids, door panels, cylinder head covers, door mirror stays, tailgate panels, license garnishes, roof rails, engine mount brackets, rear garnishes, rear spoilers, trunk lids, rocker moles, moles, lamp housings, front grills, mudguards, and side bumpers, intake and exhaust system parts such as air intake manifolds, intercooler inlets, turbochargers, exhaust pipe covers, inner bushes, bearing retainers, engine mounts, engine head covers, resonators, and throttle bodies, engine cooling water system parts such as chain covers, thermostat housings, outlet pipes, radiator tanks, alternators, and delivery pipes, automotive electrical parts such as connectors, wire harness connectors, motor parts, lamp sockets, sensor on-vehicle switches, and combination switches, and as electric and electronic parts, for example, such as generators, electric motors, transformers, current transformers, voltage regulators, rectifiers, resistors, inverters, relays, power contacts, switch gears, breakers, switches, knife switches, multi-pole rods, motor cases, TV housings, laptop housings and internal parts, CRT display housings and internal parts, printer housings and internal parts, mobile phones, mobile PCs, portable terminal housings such as handheld-type mobiles and internal parts, IC and LED compatible housings, capacitor seat plates, fuse holders, various gears, various cases, and cabinets, electronic parts such as connectors, SMT compatible connectors, card connectors, jacks, coils, coil bobbins, sensors, LED lamps, sockets, resistors, relays, relay cases, reflectors, small switches, power supply parts, coil bobbins, capacitors, variable capacitor cases, optical pickup chassis, oscillators, various terminal boards, transformers, plugs, printed circuit boards, tuners, speakers, microphones, headphones, small motors, magnetic head bases, power modules, Si power modules and SiC power modules, semiconductors, liquid crystals, FDD carriages, FDD chassis, motor brush holders, transformer members, parabolic antennas, and computer-related parts and the like.

EXAMPLES

Examples will be shown below and our substrates and molded articles explained further concretely, but this disclosure is not limited to the description of these examples. The evaluation of properties in each Example and Comparative Example was performed according to the following methods.

Heat Resistance

The polymer alloys and the thermoplastic resins obtained in the Examples and Comparative Examples were pressed to produce press films. Each of them was cut at (length) 40 mm×(width) 8 mm×(thickness) 0.1 mm, and a storage elastic modulus E was determined under the following measurement conditions using a dynamic viscoelasticity measuring device (DMS6100) supplied by Seiko Instruments Inc. The determined value of the storage elastic modulus E' is an average value of 3 samples. The higher the storage elastic modulus E' is, the more excellent the high temperature rigidity of the material is, and the more improved the heat resistance is.

Measurement mode: tensile mode
Temperature conditions: 1st step 50° C.×2 minutes hold, 2nd step 50° C.→270° C. temperature rise
Rate of heating: 2° C./min
Measurement frequency: 1 Hz
Minimum tension: 200 mN
Strain amplitude: 10 μm
Tension gain: 1.5
Initial value of force amplitude: 2000 mN Tensile Strength The laminate prepared by arranging the fiber-reinforced polymer alloy substrate and the fiber-reinforced thermoplastic resin substrate obtained in each of Examples and Comparative Examples so that the fiber direction was unidirectional, and laminating to have a thickness of 1±0.2 mm was put into a molding die whose mold temperature was heated to the melting temperature of the matrix resin+30° C. Subsequently, the laminate was heated and pressed at a pressure of 3 MPa for 1 minute and then cooled and pressed at a pressure of 3 MPa to obtain a molded plate. A 250 mm×15 mm test piece was cut out from the molded plate with the long side in the fiber axis direction. A tensile test was performed on the obtained test piece using "Instron" (registered trademark) Universal Testing Machine Model 4201 (supplied by Instron Corporation) to measure the tensile strength. The measurement was performed 3 times, and the coefficient of variation was calculated from the average value and the standard deviation.

The coefficient of variation of tensile strength was used as a criterion for determination of the stability of mechanical properties, and the evaluation was performed by the following two grades, and grade ○ was determined to be passed.
○: Coefficient of variation is less than 5%.
x: Coefficient of variation is 5% or more.

Raw Material

In the Examples and Comparative Examples, the raw materials shown below were used.
Thermoplastic resin and thermoplastic polymer alloy:
Polyphenylene sulfide (PPS): "TORELINA" (registered trademark) supplied by Toray Industries, Inc.
Polyether ether ketone (PEEK): "VICTREX" (registered trademark) supplied by Victorex Japan Co., Ltd.
Polyether ketone ketone (PEKK): "KEPSTAN" (registered trademark) supplied by Arkema Co., Ltd.
Polyethersulfone (PES): "SUMIKA EXCEL" (registered trademark) supplied by Sumitomo Chemical Co., Ltd.
Polyetherimide (PEI): "ULTEM" (registered trademark) supplied by SABIC Co., Ltd.

Example 1

The raw material was mixed with the composition shown in Table 1 and charged into a feed port of a twin-screw extruder. As the twin-screw extruder, a same direction-rotating twin-screw extruder with a screw diameter of 25 mm and L/D=41 (HK-25D (41D) supplied by Parker Corporation) was used. Melt kneading was performed at predetermined kneading temperature and screw rotational speed, and a strand-shaped molten resin was discharged from a discharge port. The discharged strand-shaped molten resin was cooled by passing through a cooling bath, and cut while being pulled by a pelletizer to obtain pellet samples of polymer alloy. The obtained polymer alloy was subjected to the aforementioned evaluation. The evaluation results are shown in Table 1.

Carbon fibers (referred to as CF in Table 1) were used as reinforcing fibers, six bobbins wound with carbon fiber bundles were prepared, and the respective carbon fiber bundles were continuously fed from each bobbin through a yarn-path guide. A matrix resin (a polymer alloy of "TORELINA" (registered trademark) supplied by Toray Industries, Inc.): polyphenylene sulfide [indicated as PPS in Table 1] and "ULTEM" (registered trademark) supplied by Subic Co., Ltd.: polyetherimide [indicated as PEI in Table 1]), which was supplied at a fixed amount from a feeder filled therewith, was impregnated into the carbon fiber bundles continuously fed in an impregnation die. Carbon fibers impregnated with the polymer alloy as a matrix resin with a weak force that does not deteriorate the dispersion of the reinforcing fiber bundles in the impregnated die were continuously drawn out from a nozzle of the impregnation die at a drawing speed of 1 m/min using a take-up roll. The passage time of the carbon fiber bundle through the nozzle was 4.0 seconds. The drawn-out carbon fiber bundle was passed through a cooling roll to cool and solidify the polymer alloy, and it was wound by a winder as a tape of a continuous fiber-reinforced polymer alloy substrate. The obtained fiber-reinforced polymer alloy substrate had a thickness of 0.1 mm and a width of 50 mm, and the reinforcing fibers were arranged in one direction. The obtained fiber-reinforced polymer alloy substrate was subjected to the aforementioned evaluation. The evaluation results are shown in Table 1.

TABLE 1

| | | | | Example 1 | Example 2 | Example 3 | Example 4 | Example 5 | Example 6 |
|---|---|---|---|---|---|---|---|---|---|
| Raw material | Reinforcing fiber | | — | CF | CF | CF | CF | CF | CF |
| | Resin content by weight | PPS | % | 75 | 75 | 75 | 75 | 75 | 75 |
| | | PEI | % | 25 | 25 | 25 | — | — | — |
| | | PEEK | % | — | — | — | 25 | — | — |
| | | PEKK | % | — | — | — | — | 25 | — |
| | | PES | % | — | — | — | — | — | 25 |
| Properties of polymer | Storage elastic modulus | 110° C. | GPa | 1.68 | 1.68 | 1.68 | 2.19 | 1.77 | 1.69 |
| | | 120° C. | GPa | 1.18 | 1.18 | 1.18 | 1.54 | 1.2 | 1.15 |
| Properties of tape | Fiber volume content | | % | 60 | 40 | 50 | 60 | 60 | 60 |
| | Thickness | | mm | 0.1 | 0.1 | 0.1 | 0.1 | 0.1 | 0.1 |
| | Dispersion parameter D | | % | 91 | 92 | 93 | 91 | 93 | 94 |
| | Coefficient of variation of dispersion parameters d | | % | 3.2 | 2.4 | 2.2 | 2.3 | 2.6 | 3.1 |
| | Tensile strength | | — | ○ | ○ | ○ | ○ | ○ | ○ |

TABLE 1-continued

|  |  |  |  | Example 7 | Example 8 | Example 9 | Example 10 | Example 11 | Example 12 |
|---|---|---|---|---|---|---|---|---|---|
| Raw material | Reinforcing fiber | | | — | CF | CF | CF | CF | CF | CF |
| | Resin content by weight | PPS | % | 75 | 75 | 75 | 75 | 75 | 75 |
| | | PEI | % | 25 | 25 | 25 | — | — | — |
| | | PEEK | % | — | — | — | 25 | — | — |
| | | PEKK | % | — | — | — | — | 25 | — |
| | | PES | % | — | — | — | — | — | 25 |
| Properties of polymer | Storage elastic modulus | 110° C. | GPa | 1.69 | 1.68 | 1.68 | 2.19 | 1.77 | 1.69 |
| | | 120° C. | GPa | 1.15 | 1.18 | 1.18 | 1.54 | 1.2 | 1.15 |
| Properties of tape | Fiber volume content | | % | 60 | 40 | 50 | 60 | 60 | 60 |
| | Thickness | | mm | 0.1 | 0.1 | 0.1 | 0.1 | 0.1 | 0.1 |
| | Dispersion parameter D | | % | 97 | 95 | 96 | 99 | 98 | 97 |
| | Coefficient of variation of dispersion parameters d | | % | 1.1 | 1.5 | 1.2 | 2.3 | 2.6 | 1.8 |
| | Tensile strength | | — | ○ | ○ | ○ | ○ | ○ | ○ |

Examples 2 to 6

Fiber-reinforced polymer alloy substrates were obtained in the same manner as in Example 1 other than conditions where the respective matrix resins were changed to those shown in Table 1. The obtained fiber-reinforced polymer alloy substrates were subjected to the aforementioned evaluation. The evaluation results are shown in Table 1.

Examples 7 to 9

Carbon fibers (referred to as CF in Table 1) were used as reinforcing fibers, six bobbins wound with carbon fiber bundles were prepared, and the respective carbon fiber bundles were continuously fed from each bobbin through the yarn-path guide. The carbon fiber bundles continuously fed were passed through fixed rolls in an S-shaped path to perform a smoothing treatment. The matrix resin (a polymer alloy of "TORELINA" (registered trademark) supplied by Toray Industries, Inc.): polyphenylene sulfide [indicated as PPS in Table 1] and "ULTEM" (registered trademark) supplied by Subic Co., Ltd.: polyetherimide [indicated as PEI in Table 1]), which was supplied at a fixed amount from a feeder filled therewith, was impregnated into the smoothed carbon fiber bundles. The carbon fibers impregnated with the polymer alloy by the resin pressure in the impregnation die were impregnated with the polymer alloy as a matrix resin with a weak force so that the dispersion of the reinforcing fiber bundles were not deteriorated by an additional impregnation device. The width of the reinforcing fiber bundles was regulated so that the dispersibility would not deteriorate in the impregnation die and the additional impregnation device. It was continuously drawn out from a slit of the additional impregnation device using a take-up roll at a drawing speed of 1 m/min. The drawn-out carbon fiber bundle was passed through a cooling roll to cool and solidify the polymer alloy, and it was wound by a winder as a tape of a continuous fiber-reinforced polymer alloy substrate. The obtained fiber-reinforced polymer alloy substrate had a width of 50 mm, and the reinforcing fibers were arranged in one direction. The obtained fiber-reinforced polymer alloy substrates were subjected to the aforementioned evaluation. The evaluation results are shown in Table 1.

Examples 10 to 12

Fiber-reinforced polymer alloy substrates were obtained in the same manner as in Example 7 other than conditions where the respective matrix resins were changed to those shown in Table 1. The obtained fiber-reinforced polymer alloy substrates were subjected to the aforementioned evaluation. The evaluation results are shown in Table 1.

Comparative Example 1

A fiber-reinforced thermoplastic resin substrate was obtained in the same manner as in Example 7 other than the condition where a matrix resin ("TORELINA" (registered trademark) supplied by Toray Industries, Inc.): polyphenylene sulfide [indicated as PPS in Table 2]) was used. The obtained fiber-reinforced polymer alloy substrate was subjected to the aforementioned evaluation. The evaluation results are shown in Table 2.

Comparative Examples 2 to 4

In Comparative Example 2, the fiber volume content was set at 30% as compared with the condition of Example 1, and in Comparative Examples 3 and 4, the conditions were out of the range of various preferable manufacturing conditions as aforementioned for the fiber-reinforced polymer alloy substrate, and therefore, in particular, since the deviation parameter D could not be achieved to reach 90% or more, the evaluations of the obtained fiber-reinforced polymer alloy substrates, especially the evaluation of tensile strength, did not reach the acceptable level. The evaluation results are shown in Table 2.

TABLE 2

|  |  |  |  | Comparative Example 1 | Comparative Example 2 | Comparative Example 3 | Comparative Example 4 |
|---|---|---|---|---|---|---|---|
| Raw material | Reinforcing fiber | | — | CF | CF | CF | CF |
| | Resin content by weight | PPS | % | 100 | 75 | 75 | 75 |
| | | PEI | % | — | 25 | 25 | 25 |
| | | PEEK | % | — | — | — | — |
| | | PEKK | % | — | — | — | — |
| | | PES | % | — | — | — | — |

TABLE 2-continued

|  |  |  |  | Comparative Example 1 | Comparative Example 2 | Comparative Example 3 | Comparative Example 4 |
|---|---|---|---|---|---|---|---|
| Properties of polymer | Storage elastic modulus | 110° C. | GPa | 1.53 | 1.68 | 1.68 | 1.68 |
|  |  | 120° C. | GPa | 0.9 | 1.18 | 1.18 | 1.18 |
| Properties of tape | Fiber volume content |  | % | 60 | 30 | 60 | 60 |
|  | Thickness |  | mm | 0.1 | 0.1 | 0.1 | 0.1 |
|  | Dispersion parameter D |  | % | 92 | 75 | 85 | 76 |
|  | Coefficient of variation of dispersion parameters d |  | % | 2.2 | 4.3 | 4.5 | 4.7 |
|  | Tensile strength |  |  | — | ○ | X | X | X |

From a comparison between Examples 1 to 12 and Comparative Examples 1 to 4, our fiber-reinforced polymer alloy substrates in which reinforcing fibers and polymer alloy are uniformly dispersed have high heat resistance and uniform desired mechanical properties.

INDUSTRIAL APPLICABILITY

The fiber-reinforced polymer alloy substrate can be molded into a desired shape by an arbitrary molding method such as autoclave molding, press molding, or film molding. The molded article obtained by molding using the fiber-reinforced polymer alloy substrate is effective, for example, for applications such as aircraft engine peripheral parts, aircraft interior parts, aircraft exterior parts, uses for automobiles such as vehicle skeletons, automobile engine peripheral parts, automobile under-hood parts, automobile gear parts, automobile interior parts, automobile exterior parts, intake/exhaust system parts, engine cooling water system parts, automobile electric components, and electric/electronic parts such as LED reflectors and SMT connectors.

The invention claimed is:

1. A fiber-reinforced polymer alloy substrate in which continuous reinforcing fibers are arranged in parallel and impregnated with a polymer alloy, wherein the polymer alloy is obtained by combining thermoplastic resins of at least two types is used as the polymer alloy, the reinforcing fibers are contained at a content of 40 to 70% by volume, a distance between centers of adjacent reinforcing fibers is 5 μm to 15 μm, and a dispersion parameter D of the fibers determined by (i) to (iv) is 90% or more,
   (i) a cross section of the fiber-reinforced polymer alloy substrate perpendicular to a direction of the reinforcing fiber orientation is divided into a plurality of sections, and among them, one section is photographed,
   (ii) a captured image of the section is divided into a plurality of square units each having a side length t defined by equation (1),
   (iii) a dispersion parameter d defined by equation (2) is calculated, and
   (iv) (i) to (iii) is repeated for different sections, and an average value of the dispersion parameters d of the plurality of sections obtained from the cross section is defined as the dispersion parameter D:

$$1.5a \leq t \leq 2.5a \qquad (1)$$

wherein a: fiber diameter, t: length of one side of unit, and $$\text{dispersion parameter } d = \text{number of units containing reinforcing fibers in one section/total number of units in one section} \times 100(\%) \qquad (2).$$

2. The fiber-reinforced polymer alloy substrate according to claim 1, wherein a coefficient of variation of the dispersion parameters d is 4% or less.

3. The fiber-reinforced polymer alloy substrate according to claim 1, wherein the polymer alloy is a polymer alloy prepared by combining at least two resins selected from the group consisting of polyphenylene sulfide resin (PPS), polyarylene ether ketone resin (PAEK), polyether sulfone resin (PES), polyetherimide (PEI) and a liquid crystal polymer (LCP).

4. The fiber-reinforced polymer alloy substrate according to claim 1, wherein the polymer alloy forms a both-phases continuing structure having a structural cycle of 0.001 to 10 μm, or an island/sea structure composed of an island phase having a particle diameter of 0.001 to 10 μm and a sea phase.

5. The fiber-reinforced polymer alloy substrate according to claim 4, wherein the structural cycle of the polymer alloy or the particle diameter of a resin forming the island phase in the fiber-reinforced polymer alloy substrate is smaller than a distance between reinforcing fibers represented by equation (6):

$$z = y - 2r \qquad (6)$$

wherein z: distance between reinforcing fibers, y: distance between centers of reinforcing fibers, r: fiber radius.

6. The fiber-reinforced polymer alloy substrate according to claim 1, wherein the fiber-reinforced polymer alloy substrate has a thickness of 0.01 mm to 1.5 mm.

7. The fiber-reinforced polymer alloy substrate according to claim 1, wherein the reinforcing fibers are carbon fibers.

8. The fiber-reinforced polymer alloy substrate according claim 1, wherein the fiber-reinforced polymer alloy substrate has a void ratio of 2% or less.

9. The fiber-reinforced polymer alloy substrate according to claim 1, wherein the fiber-reinforced polymer alloy substrate is obtained by pultrusion molding.

10. A molded article comprising the fiber-reinforced polymer alloy substrate according to claim 1.

11. A composite molded article integrated with a fiber-reinforced polymer alloy substrate in which continuous reinforcing fibers are arranged in parallel and impregnated with a polymer alloy, wherein the polymer alloy is obtained by combining thermoplastic resins of at least two types is used as the polymer alloy, the reinforcing fibers are contained at a content of 40 to 70% by volume, a distance between centers of adjacent reinforcing fibers is 5 μm to 15 μm, and a dispersion parameter D of the fibers determined by (i) to (iv) is 90% or more,
   (i) a cross section of the fiber-reinforced polymer alloy substrate perpendicular to a direction of the reinforcing fiber orientation is divided into a plurality of sections, and among them, one section is photographed,
   (ii) a captured image of the section is divided into a plurality of square units each having a side length t defined by equation (1), (iii) a dispersion parameter d defined by equation (2) is calculated, and (iv) (i) to (iii) is repeated for different sections, and an average value of the dispersion parameters d of the plurality of sections obtained from the cross section is defined as the dispersion parameter D:

$$1.5a \leq t \leq 2.5a \tag{1}$$

wherein a: fiber diameter, t: length of one side of unit, and $$\text{dispersion parameter } d = \text{number of units containing reinforcing fibers in one section/total number of units in one section} \times 100(\%) \tag{2},$$

and a metal material or a molded article thereof or a resin material or a molded article thereof.

\* \* \* \* \*